March 5, 1963

A. L. DIETRICH 3,079,924

THRESHER BEATER BARS

Filed Nov. 22, 1961

INVENTOR.

BY Wayne A. Dietrich

United States Patent Office 3,079,924
Patented Mar. 5, 1963

3,079,924
THRESHER BEATER BARS
Alvin L. Dietrich, 2523 Barada St., Falls City, Nebr.
Filed Nov. 22, 1961, Ser. No. 154,366
6 Claims. (Cl. 130—27)

This invention relates to harvesters and more particularly the invention relates to a new thresher beater bar that is used for replacement of the steel rasp type beater bars used on the thresher cylinder of present day combines.

In such threshing machines, the purpose of the beater bars is to rub and beat the grain or seeds out of the heads or pods of the harvested crop. These beater bars are attached to the peripheral attaching parts of a rotatable thresher cylinder designed to carry a plurality of such beater bars. Each of these beater bars is in the form of a flat metal bar extending the length of the thresher cylinder with one side of the bar being equipped with bolts for securing the bar to the cylinder drum, discs, or attaching parts. It is one of the objects of the present invention to provide such a beater bar structure with a covering or layer of high grade synthetic cold rubber which is bonded to the flat metal bars mentioned. According to the present invention, the rubber layer includes a leading edge located sufficiently beyond the leading edge of the flat metal bar to form a cushion or shock absorbing area with the purpose of the shock absorbing area being that of absorbing the impact of the material entering the threshing chamber and contacting the bar. With a shock absorbing area being provided in front of the securing bond between the rubber layer and the beater bar, the rubber layer is protected from being torn free of the metal bar.

It is a further object of my invention to provide an integral portion with the shock absorbing area of the rubber layer which extends rearwardly over a portion of the leading edge of the inner face of the flat metal bar. This integral portion of the rubber layer is clamped or tightened between the cylinder attaching parts and the flat metal bar for the purpose of further securing the rubber layer to the surface of the flat metal bar.

A still further object of the present invention is the provision of a wire cable or other metal element which is embedded within the body of the rubber layer adjacent the surface of the flat metal bar and near the mid-portion of the rubber layer. Since the wire cable is more dense than the surrounding rubber, the rubber material adjacent the wire cable is maintained in a more or less rigid state while the rubber on the forward and rearward sides of the cable is premitted to flex. Under working conditions, the drag force or friction of the incoming grain will cause the rubber on the forward portion of the beater bar to move inwardly and rearwardly and then outwadly adjacent the leading edge of the wire cable. At the same time, the rubber material on the rearward side of the wire cable will be caused to move inwardly and rearwardly. The provision of the flexible layer thus makes the cylinder spacing automatic in that the spacing will vary according to the varying force caused by the incoming grain.

A still further object of the present invention is to provide a thresher beater bar with a soft, pliable covering which prevents pulverizing and cracking of the grain being harvested to thereby increase the efficiency of the operation and obtain more seed, less cracked seed, and far less pulverized seed which is lost.

Further objects and advantages of the present invention will be apparent from the description and accompanying drawings wherein.

Figure 1:
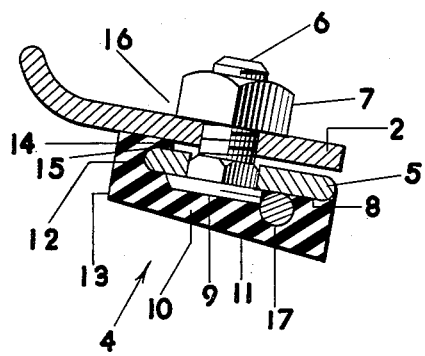
FIGURE 1 is an enlarged vertical section view of a thresher bar attached to a fragment of a cylinder attaching part of a threshing machine, as shown in FIGURE 3, with the apparatus being shown in a non-rotating motionless position, and also in a rotating motion position, when there is no grain in the threshing chamber.

Referring now to the drawings, a rotatable thresher cylinder, dic or drum 1 has a plurality of circumferentially spaced cylinder beater bar attaching parts 2 mounted thereon. Each cylinder beater bar attaching part 2, with holes formed therein at spaced intervals, extends the length of the cylinder 3. Each cylinder beater bar attaching part 2 has a thresher beater bar 4 mounted thereon. Each thresher beater bar 4 has a flat metal bar support member 5 with bolts 6 extending through the holes in the flat metal bar support member 5 and through registering holes in the cylinder beater bar attaching part 2. A nut 7 is threadedly mounted on the bolts 6 to secure the thresher beater bar 4 in position on the cylinder beater bar attaching part 2. The thresher beater bar 4 extends substantially the full length of the cylinder 3. The flat metal support portion 5 of the thresher beater bar 4 has an outer face 8 which includes the outer face 9 of the bolts 6. A layer 10 or resilient, deformable, elastomeric material, such as synthetic cold rubber, is secured as by vulcanization, to the outer face 8 of the metal bar 5 and the outer face 9 of the bolths, and over substantially the entire area thereof. The cylinder beater bar attaching part 2 is secured to the cylinder drum 1 at a slight angle, so that the thresher beater bar 4, being attached to the cylinder beater bar attaching part 2, will be disposed with the outer threshing surface 11 of the layer 10 positioned sufficiently at an angle. The incoming grain will thus be rubbed, and beaten harder by the rearward portion of the outer surface 11 of the layer 10 than by the forward portion of the outer surface 11. The forward portion 12 of layer 10 extends ¼" forward beyond the leading edge of the beater bar flat metal support member 5. This forward portion 12 is the shock absorbing area of the beater bar covering 10 and has a leading edge 13. The forward portion 12 also has an inner rearward portion 14 of rubber of approximately ¹⁄₁₆" thickness which extends rearwardly ³⁄₁₆" on the inner face 15 of the flat metal bar support member 5. The inner rearward portion 14 is further secured by vulcanization to the inner forward face 15 of the beater bar metal support member 5. The rubber portion 14 is also clamped between the inner forward face 15 of the beater bar metal support member 5 and the forwardly outer face 16 of the cylinder beater bar attaching part 2. A metal element such as a ¼" wire cable 17, is embedded in the rubber layer 10 by vulcanization therein and is located ⁷⁄₁₆" forward of the rear side of the beater bar metal support member 5, adjacent the outer face 8 of the flat metal support member 5. The invention is illustrated in FIGURE 1 in its non-rotating, or rotating position, with no grain in the threshing chamber. The illustrations in FIGURE 1, and in FIGURE 2 further show the beater bar 4 as not being drawn tightly to the cylinder beater bar attaching part 2 merely for the purpose of clear illustration. When in operation, the beater bar 4 and the cylinder beater bar attaching part 2 will be drawn tightly together so as to compress the rubber portion 14 between the forward inner face 15 of the beater bar metal support member 5 and the outer face 16 of the cylinder beater bar attaching part 2.

Figure 2:
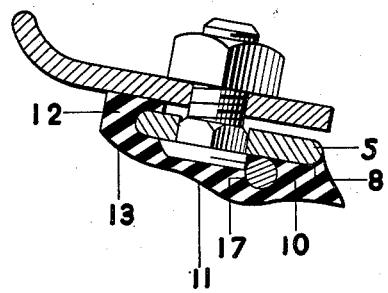
FIGURE 2 is a vertical section view of the beater bar shown in FIGURE 1 in its condition when the thresher is in an operating state, when there is grain in the threshing chamber.

As seen in FIGURE 2, with the thresher cylinder being illustrated in its operating and rotating state, with grain in the threshing chamber, the outer leading edge 13 of the forward portion 12 of the outer covering 10 has moved inwardly and rearwardly about 1/8", whereas the portion of the covering 10 positioned forwardly of the leading side of the wire cable 17 has moved the outer surface 11 slightly outwardly. Under these conditions, the portion of the outer surface 11 of the covering 10 that is positioned outward from the outer side of the wire cable 17 has remained about the same as when in a non-operating state. The outer surface 11 of the rearward portion of the covering 10 that is rearward from the rear side of the wire cable 17 has moved inwardly and rearwardly about 5/32" as a result of the incoming grain passing between the non-rotatable concave 18 and the beater bar 4. The moving material causes a heavy drag or friction on the leading edge 13 of the forward portion 12 of the covering 10 as well as along the surface 11. Since the wire cable 17 is more dense than the rubber covering 10, the portion of the outer surface 11 that is positioned outwardly from the outer side of the wire cable 17 remains stationary. Thus there is formed a soft, pliable, and movable shock absorbing area which includes the leading edge 13 and the outer surface 11 and the forward portion of layer 10, a fairly firm outer surface 11 outward from the wire cable 17, and a soft, pliable, outer surface 11 on the rearward portion of the covering 10 which is movable inwardly and rearwardly. The forward shock absorbing portion 12 absorbs the shock of small rocks, large weeds, and any hard large material that may enter the threshing chamber. This action protects the securing bond of the rubber covering 10 on the forward outer face 8 of the flat metal support member 5, and makes possible a smoother more gentle beating, and rubbing of the grain on the outer surface 11 of the layer 10.

The inner rearward rubber portion 14, when compressed by tightening between the outer face 16 and the inner face 15 and also vulcanized to the inner face 15, gives a tremendous holding power to the shock absorbing portion 12, and also to the outer covering layer 10, so as to help keep the portions 12 and 10 secured to the forward and outer face 8 of metal support bar 5 and the outer face 9 of bolts 6.

The presence of wire cable 17 makes it possible to maintain the portion of the outer surface 11 that is outward from the outer side of the wire cable 17, in a quite stationary state, while permitting the portion of the outer surface 11 that is positioned rearward from the rear side of the wire cable to move inwardly about 5/32" and rearwardly about 5/32". This distortion allows for needed extra room for a thick layer of grain to pass between the cylinder beater bar 4 and the non-rotatable concave 18 so as not to crack or damage the grain seeds. When the layer of grain is much thinner, the outer surface 11 on the rear portion of layer 10 will move sufficiently back toward the original position so as to compensate for the thinner layer while still giving adequate beating and rubbing treatment to the grain. The movement of the flexible layer thus makes the cylinder beater bar 4 automatic in maintaining the proper distance between the beater bar 4 and the non-rotatable concave 18 to compensate for the variable thickness of the layer of passing grain.

The rubber layer 10 may be formed of a strip 7/16" thick at its rearward edge and gradually extending to 1/4" thick at the leading edge of the flat metal support member 5. The layer 10 then extends inwardly an additional 1/4" so that the forward end portion of the cover will be a total of 1/2" thick and will extend forward 1/4" beyond the end of beater bar metal support member 5 to the leading edge 13. The layer 10 covers the entire length of the flat metal bar support member 5 and is vulcanized to a precemented outer face 9 and outer face 8 of the flat metal bar support member 5, and a precemented wire cable 17 by placing the elements in a properly shaped mold. The rubber will then shape in the mold to form the inner portion 14.

Figure 3:
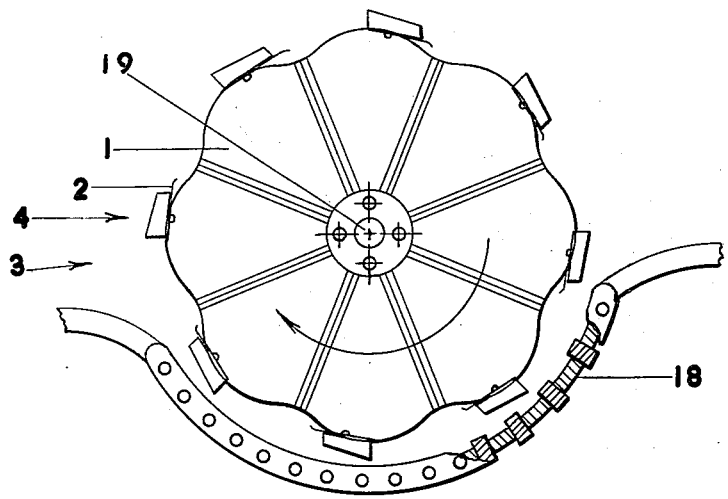
FIGURE 3 is an end elevation view of a thresher cylinder according to the invention showing a portion of the non-rotating concave, partly in section, of the threshing machine.

In FIGURE 3, there is illustrated a cylinder 3 having a central shaft 19 and a plurality of thresher beater bars 4 mounted on the cylinder beater bar attaching part 2 which is in turn attached to the circumference of the cylinder drum 1. A generally circular concave 18 extends beneath and is spaced from the cylinder 3. The concave 18 is non-rotatably mounted on a threshing machine.

In operation of the threshing machine, the harvested grain is moved between cylinder 3 and concave 18. The thresher beater bar 4, moving at a relatively high speed, beats and rubs the grain seeds from the straw or pods, leaving most of the thresher seeds to fall through the concave 18. The straw and the remaining seeds are forced and drawn past the rear of the concave 18 to be thrown on the straw racks for further and completed separation.

While a preferred embodiment of the invention has been illustrated in the drawings, the invention is not limited to the details shown therein. The location of the wire cable 17 or the dimensions of the rubber layer 10 may be altered within the scope of the present invention. The rubber layer 10 is advantageously made of synthetic cold rubber, but it can also be made of natural rubber or any soft, resilient workable material that can be secured to the outer face 8 of the flat metal bar support member 5 of the thresher beater bar 4.

Having described my invention and a preferred embodiment thereof, I wish to be limited only by the scope of the following claims:

1. A thresher beater bar for attachmnet to the peripheral attaching parts of a rotatable thresher cylinder comprising, a metal bar support member for attachment to said peripheral attaching parts and having an outer face extending lengthwise substantially the full length of said thresher cylinder, a layer of resilient deformable elastomeric material of substantial thickness secured to the outer face of said bar support member and extending lengthwise substantially the full length thereof, said elastomeric layer being formed to extend forward from the rearward edge of said bar support member to a point substantially beyond the leading edge of said bar support member, inward to the peripheral attaching parts and rearwardly along the inner face of said bar support member with the portion of said elastomeric layer located on the inner face of said bar support member being compressed between said peripheral attaching parts and said bar support member, the rearward edge of said elastomeric layer being located at a greater radial distance outwardly than the leading edge thereof, a metal element of substantial thickness embedded in said elastomeric material at a position spaced from the rearward edge thereof and adjacent said bar metal support member with the metal element extending along substantially the entire length of said bar support member, whereby said elastomeric layer will move outwardly adjacent the leading edge of the metal element and will move inwardly and rearwardly on the rearward side of said metal element.

2. A thresher beater bar according to claim 1 wherein said elastomeric layer extends forward from the leading edge of said bar support member approximately 1/4" with a thickness of approximately 1/2".

3. A thresher beater bar according to claim 1 wherein said elastomeric layer extends rearwardly along the inner face of said bar support member a distance of approximately 3/16" with a thickness of 1/16".

4. A thresher beater bar according to claim 1 wherein said metal element is of greater density than said elastomeric layer and said metal element is approximately 1/4" in diameter and embedded in said elastomeric layer at a position approximately 7/16" inwardly from the rearward edge thereof.

5. A thresher beater bar according to claim 1 wherein said elastomeric layer has a greater thickness at the rearward edge thereof than at the forward portion thereof adjacent the leading edge of said bar support member.

6. A thresher beater bar according to claim 1 wherein, said peripheral attaching part is disposed at an angle with relation to the surface of said thresher cylinder.

References Cited in the file of this patent

UNITED STATES PATENTS 2,829,652    Dietrich _____ Apr. 8, 1958

FOREIGN PATENTS 899,290    Germany _____ Dec. 10, 1953